United States Patent
Cao et al.

(10) Patent No.: US 12,292,913 B2
(45) Date of Patent: May 6, 2025

(54) AUTOMATIC INDUSTRY CLASSIFICATION METHOD AND SYSTEM

(71) Applicant: BEIJING BENYING TECHNOLOGIES CO., LTD., Beijing (CN)

(72) Inventors: Kai Cao, Beijing (CN); Weining Li, Beijing (CN); Minyue Zhang, Beijing (CN)

(73) Assignee: BEIJING BENYING TECHNOLOGIES CO., LTD., Beijing (CN)

(*) Notice: Subject to any disclaimer, the term of this patent is extended or adjusted under 35 U.S.C. 154(b) by 425 days.

(21) Appl. No.: 17/788,303

(22) PCT Filed: Jan. 19, 2020

(86) PCT No.: PCT/CN2020/073042
§ 371 (c)(1),
(2) Date: Jun. 23, 2022

(87) PCT Pub. No.: WO2021/128521
PCT Pub. Date: Jul. 1, 2021

(65) Prior Publication Data
US 2022/0374462 A1    Nov. 24, 2022

(30) Foreign Application Priority Data
Dec. 25, 2019  (CN) .......................... 201911358987.3

(51) Int. Cl.
*G06F 16/353* (2025.01)
*G06F 18/243* (2023.01)

(52) U.S. Cl.
CPC ...... *G06F 16/353* (2019.01); *G06F 18/24323* (2023.01)

(58) Field of Classification Search
CPC ............. G06F 16/353; G06F 18/24323; G06F 2216/11; G06F 40/30; G06Q 50/184
See application file for complete search history.

(56) References Cited

U.S. PATENT DOCUMENTS 10,832,419 B2* 11/2020 Bharti .................... G06N 20/00
12,099,816 B2*  9/2024 Jalaluddin ............ G06F 40/295
(Continued)

FOREIGN PATENT DOCUMENTS

| CN | 1494013 A | 5/2004 |
| CN | 102141978 A | 8/2011 |

(Continued)

OTHER PUBLICATIONS

Meng-Jung Shih, et al., Patent Classification Using Ontology-Based Patent Network Analysis, PACIS 2010 Proceedings, 2010, pp. 962-972, vol. 95.

(Continued)

*Primary Examiner* — Pierre M Vital
*Assistant Examiner* — Zuheir A Mheir
(74) *Attorney, Agent, or Firm* — Bayramoglu Law Offices LLC

(57) ABSTRACT

An automatic industry classification method comprises: determining a scope of target patents, defining a target industry tree; generating marks on the target industry tree; performing a rough classification for the target patents by using the marks; performing a fine classification for the target patents according to a result of the rough classification. The automatic industry classification method and system provided by the present invention uses a transductive learning method, so that full mining of small annotation quantity information is realized. The automatic industry classification method and system uses information of IPC, so that information dimension is enriched, and calculation (Continued)

amount needed in the classification is reduced. The automatic industry classification method and system further uses the hierarchical vectors generated by the abstract, the claims and the description, so that the information of word order relation is reserved, and the patent text is deeply mined.

11 Claims, 7 Drawing Sheets

(56) References Cited

U.S. PATENT DOCUMENTS

| | | | |
|---|---|---|---|
| 2002/0042793 A1* | 4/2002 | Choi | G06F 16/353 |
| 2014/0344195 A1* | 11/2014 | Drew | G06F 16/35 |
| | | | 706/12 |
| 2019/0005396 A1* | 1/2019 | Krutsch | G06V 20/58 |
| 2019/0354589 A1* | 11/2019 | Aikawa | G06F 40/30 |
| 2020/0372400 A1* | 11/2020 | Carreira-Perpiñán | |
| | | | G06F 16/9027 |
| 2021/0334475 A1* | 10/2021 | He | G06F 40/237 |

FOREIGN PATENT DOCUMENTS

| | | | | |
|---|---|---|---|---|
| CN | 102567464 A | | 7/2012 | |
| CN | 103902591 A | | 7/2014 | |
| CN | 104978328 A | | 10/2015 | |
| CN | 105808524 A | | 7/2016 | |
| CN | 106845798 A | | 6/2017 | |
| CN | 107704469 A | * | 2/2018 | ........... G06F 16/353 |
| CN | 108304865 A | | 7/2018 | |
| EP | 3535419 A1 | | 9/2019 | |
| WO | 2018083467 A1 | | 5/2018 | |

OTHER PUBLICATIONS

Farshad Madani, Opportunity Identification for New Product Planning: Ontological Semantic Patent Classification, Dissertations and Theses, 2018, pp. 1-175, paper 4232, Portland State University.
Christoph Quix, et al., Ontology Matching for Patent Classification.

* cited by examiner

AUTOMATIC INDUSTRY CLASSIFICATION METHOD AND SYSTEM

CROSS REFERENCES TO THE RELATED APPLICATION

This application is a national phase of International Patent Application No. PCT/CN2020/073042 filed on Jan. 19, 2020, which claims priority based on Chinese patent application 201911358987.3 filed on Dec. 25, 2019. The disclosures of the aforementioned applications are hereby incorporated by reference in their entireties.

TECHNICAL FIELD

The present invention relates to the technical field of literature analysis, in particular to an automatic industry classification method and system.

BACKGROUND

A rapid development of science and technology brings about a proliferation of patent texts and continuous emergence of new industries. In order to analyze the technical development in an industry background, a patent needs to be labeled with an industry label. A manual labeling method is slow, expensive, but high in accuracy. Therefore, an automatic classification method with less labeling amount, higher computational efficiency and more fully mining labeling information is needed.

Existing methods either require a large amount of manual labeling, or do not need manual labeling at all and this causes a corresponding relationship with a target industry cannot be directly established. The existing methods generally use the patent text to carry out natural language processing, which is computationally expensive and omits important information of International Patent Classification (IPC) dimension. Natural language processing methods used in the existing methods generally mine information from an angle of a single word, which makes information of word order relation lost. The natural language processing methods used in the existing methods generally mine information in one or more of title, abstract, claims and description, but do not use hierarchical vectors generated by the abstract, the claims and the description, which makes deep information contained in the patent text omitted.

An invention patent with publication No. CN105808524A discloses a patent automatic classification method based on the abstract of patent documents, the method comprises dictionary construction, generation of category feature vectors at all levels of IPC, selection of patent text features, vectorization of patent text, construction of an SVM-based classification model and classification of a to-be-classified patent. The disadvantage of this method is that the natural language processing method used loses the information of word order relation, and does not use the hierarchical vectors generated by the abstract, the claims and the description, and the deep information contained in the patent text is omitted.

SUMMARY

In order to solve the above mentioned technical problems, an automatic industry classification method and system provided by the present invention uses a transductive learning method, so that full mining of small annotation quantity information is realized; uses information of IPC, so that information dimension is enriched, and calculation amount is reduced; uses the hierarchical vectors generated by the abstract, the claims and the description, so that the information of word order relation is reserved, and the patent text is deeply mined.

A first object of the present invention is to provide an automatic industry classification method. The method comprises determining a scope of target patents, and further comprises the following steps:
step 1: defining a target industry tree;
step 2: generating marks on the target industry tree;
step 3: performing a rough classification for the target patents by using the marks;
step 4: performing a fine classification for the target patents according to a result of the rough classification.

Preferably, the step 1 comprises that an industry tree $I=\{i_1, \ldots, i_j, \ldots, i_n\}$ is defined as needed, wherein, $i_j \in I$ and is a first level industry, j is a serial number of the first level industry, $1 \leq j \leq n$, n is the number of all leaf nodes of I.

In any of the above solutions, it is preferred that the step 1 further comprises setting $i_{jkl\ldots} = \{i_{jkl\ldots 1}, \ldots, i_{jkl\ldots t}\}$ as any non-leaf node of I, degree of other nodes except the leaf nodes is greater than or equal to 2, wherein, k is a serial number of a second level industry, l is a serial number of a third level industry, and t is a serial number of a penultimate level industry.

In any of the above solutions, it is preferred that a step of determining a scope of target patents is to manually determine the scope of patents to be classified as needed.

In any of the above solutions, it is preferred that the step 2 comprises: according to resource constraints, determining the number p of patents which can be marked, $p \geq N$, each leaf node of the industry tree should be marked with at least one patent belonging to the node, wherein, N is the number of the last level industry.

In any of the above solutions, it is preferred that the step 3 is determining nodes above the leaf node.

In any of the above solutions, it is preferred that the step 3 comprises the following sub-steps:
step 31: generating a node set V of a graph;
step 32: arranging the marks;
step 33: generating an edge set E of the graph;
step 34: generating an adjacency matrix;
step 35: performing node division.

In any of the above solutions, it is preferred that the step 31 comprises that IPC(s) of each target patent is defined as an IPC combination $IPC_v = \{ipc_1, \ldots, ipc_q\}$ and all different IPC combinations of the target patents form the node set V.

In any of the above solutions, it is preferred that the step 32 comprises that the industry on the leaf node marked with patents is taken as a classification $y_i \in \mathcal{Y}$ of the leaf node, the number of nodes which have been marked is set to be l, a sequence of the nodes is adjusted, and the marked nodes is adjusted to be the front, then $1 \leq i \leq l$.

In any of the above solutions, it is preferred that the step 32 further comprises verifying whether l<<the number of unmarked nodes u, and if not, adjusting the marked patent, otherwise $V = \{IPC_1, \ldots, IPC_l, IPC_{l+1}, \ldots, IPC_{l+u}\}$.

In any of the above solutions, it is preferred that the edge set E is a matrix, and weight $e_{ij}$ of edges between two vertices is the number of patents in a union $IPC_i \cup IPC_j$ of IPCs of the two vertices, wherein, $e_{ij}$ is value in the matrix E.

In any of the above solutions, it is preferred that the step 34 comprises the following sub-steps:
step 341: generating a distance matrix S;
step 342: generating the adjacency matrix W by using the distance matrix S.

In any of the above solutions, it is preferred that a calculation formula of the distance matrix S is $s_{ij}=\|e_i-e_j\|_2$, wherein, $e_i$ and $e_j$ are respectively the i-th row and the j-th row of the edge set E.

In any of the above solutions, it is preferred that the step 35 comprises the following sub-steps:

step 351: generating a degree matrix $D=\text{diag}(d_1, d_2, \ldots, d_{l+u})$, its diagonal element is $d_i=\Sigma_{j=1}^{l+u} W_{ij}$, wherein, u is the number of unmarked nodes, and $W_{ij}$ is the adjacent matrix;

step 352: generating a marked matrix, a nonnegative $(l+u)\times|\mathcal{Y}|$ marked matrix $F=(F_1^T, F_2^T, \ldots, F_{l+u}^T)^T$, the element of the i-th row $F_i=(F_{i1}, F_{i2}, \ldots, F_{i|\mathcal{Y}|})$ is a marked vector of $IPC_i$ in the node set, a classification rule is $y_i=\text{argmax } x_{1\leq j\leq|\mathcal{Y}|} F_{ij}$, wherein, $\mathcal{Y}$ is a set of industries, T represents transpose of the matrix;

step 353: initializing the marked matrix F, for $i=1, 2, \ldots, m$ and $j=1, 2, \ldots,$ $$|\mathcal{Y}|, F(0) = Y_{ij} = \begin{cases} 1, & \text{if } (1 \leq i \leq l) \wedge (y_i = j) \\ 0, & \text{otherwise} \end{cases};$$

step 354: constructing a propagation matrix $$B = D^{-\frac{1}{2}} W D^{-\frac{1}{2}},$$

wherein, $$D^{-\frac{1}{2}} = \text{diag}\left(\frac{1}{\sqrt{d_1}}, \frac{1}{\sqrt{d_2}}, \ldots, \frac{1}{\sqrt{d_{l+u}}}\right),$$

d represents diagonal elements of the degree matrix D;

step 355: generating an iterative calculation formula $F(t+1)=\alpha BF(t)+(1-\alpha)Y$, wherein, $\alpha\in(0,1)$ is a parameter, F(t) is a result of the t-th iteration, and Y is an initial matrix;

step 356: iterating the calculation formula to convergence to obtain a state $$F^* = \lim_{t\to\infty} F(t) = (1-\alpha)(M-\alpha B)^{-1} Y$$

under convergence, wherein, M is a unit matrix;

step 357: performing a prediction of unmarked nodes $y_i=\text{argmax} x_{1\leq j\leq|\mathcal{Y}|} F_{ij}^*$, wherein, $l+1\leq i\leq l+u$.

In any of the above solutions, it is preferred that the step 4 comprises the following sub-steps:

step 41: setting objects to be classified;
step 42: extracting text information of patents;
step 43: generating text sets to be trained;
step 44: performing text vectorization;
step 45: performing patent classification;
step 46: in any leaf node classed by the step 45, identifying the patent that does not belong to any industry of the leaf node on the tree.

In any of the above solutions, it is preferred that the step 41 comprises taking the patent nodes of each class divided in the step 3 as a group, that means patents corresponding to node marked as $y_i\in\mathcal{Y}$ are a group, there are $|\mathcal{Y}|$ groups.

In any one of the above solutions, it is preferred that the step 42 comprises extracting abstract, claims and description of each patent in each group, performing word segmentation of text information of patent by using an existing tool, and generating a text set $G=\{g_1, \ldots, g_n\}$, wherein $g_i=(p_{i1}, p_{i2}, p_{i3})$, $p_{i1}$, $p_{i2}$ and $p_{i3}$ are respectively word sequences obtained by word segmentation of the abstract, the claims, and the description of the i-th patent.

In any of the above solutions, it is preferred that the text sets to be trained comprise the text set G, a text set $G_1=\{p_{11}, \ldots, p_{n1}\}$, a text set $G_2=\{p_{12}, \ldots, p_{n2}\}$ and a text set $G_3=\{p_{13}, \ldots, p_{n3}\}$, which are respectively composed of word segmentation results of the all-texts, the abstracts, the claims, and the descriptions of the patents in the group.

In any of the above solutions, it is preferred that the step 44 comprises the following sub-steps:

step 441: vectoring the text in the text sets to be trained;
step 442: generating a matrix of text.

In any of the above solutions, it is preferred that the step 441 comprises that: in each text set to be trained, an element $P=(t_1, \ldots, t_m)$ is a segmented word sequence with m elements, $t_i\in P$ is determined by w words $t_{i,\ context}=\{t_{i-w}, \ldots, t_{i-2}, t_{i-1}, t_{i+1}, t_{i+2}, \ldots, t_{i+w}\}$ before and after it, and by maximizing $$\frac{1}{m}\sum_{i=w}^{m-w} \log\ p(t_i\ |\ t_{i,\ context}, pid)$$

wherein, the pid is a paragraph number of $t_i$ in p, $$p(t_i\ |\ t_{i,\ context}, pid) = \frac{e^{y_{t_i}}}{\sum_j e^{y_j}},$$

$y_{t_i}=b+U\Phi(t_{i,\ context},\text{pid})$, U and b are parameters of softmax, and a vector corresponding to P is obtained by training data to be trained using a stochastic gradient descent method.

In any one of the above solutions, it is preferred that the step 442 comprises that the vectorization results of $G=\{g_1, \ldots, g_n\}$, $G_1=\{p_{11}, \ldots, p_{n1}\}$, $G_2=\{p_{12}, \ldots, p_{n2}\}$ and $G_3=\{p_{13}, \ldots, p_{n3}\}$ are supposed to be respectively $H_1=\{h_{11}, \ldots, h_{n1}\}$, $H_2=\{h_{12}, \ldots, h_{n2}\}$, $H_3=\{h_{13}, \ldots, h_{n3}\}$, and $H_4=\{h_{14}, \ldots, h_{n4}\}$, then a generated set of matrix of text of target patents is $H=\{h_1, \ldots, h_n\}$, wherein $h_i=(h_{i1}, h_{i2}, h_{i3}, h_{i4})$.

In any of the above solutions, it is preferred that the step 45 comprises that: marked patents are set as $S=\cup_{j=1}^k S_j\subset H$, wherein, $S_j\neq\emptyset$ is the marked patent of the j-th leaf node on the industry tree, j cluster centers of a k-means algorithm are initialized using the marked patents, and cluster membership of marked patents is not changed in an iterative updating process of clusters.

In any of the above solutions, it is preferred that the step 46 comprises the following sub-steps:

step 461: a k distance of a patent p is calculated, and a k-th distance of the patent p is set as k−distance(o), and in patents divided into a leaf node on the industry tree, there is a patent o, and the distance between the patent o and the patent p is d(p, o);

step 462: a k-th distance domain of the patent p is calculated: a patent set whose distance from the patent p is ≤k−distance(o) is called the k-th distance domain $N_k(p)$ of the patent p;

step 463: a reachable distance reachdist(p, o)=max{k−distance(o), ‖p−o‖} of the patent p relative to the patent o is calculated;

step 464: a local reachable density $$lrd_k(p) = \frac{|N_k(p)|}{\sum_{o \in N_n(p)} reach_d ist_k(p, o)}$$

is calculated;

step 465: a local outlier factor $$LOF_k(p) = \frac{\sum_{o \in N_n(p)} \frac{lrd_k(o)}{lrd_k(p)}}{|N_k(p)|}$$

is calculated;

step 466: if LOF(p) is greater than a threshold, it is thought that p is an outlier, and does not belong to the leaf node.

In any of the above solutions, it is preferred that if the following two conditions are met, k–distance(o)=d(p, o):

① in the leaf node, there are at least k patents q to make d(p, q)≤d(p, o);

② in the leaf node, there are at most k−1 patents q to make d(p, q)<d(p, o).

A second object of the present invention is to provide an automatic industry classification system, the system comprises a confirmation module for determining a scope of target patents, and further comprises the following modules:

an industry tree generation module for defining a target industry tree;

a mark generation module for generating marks on the target industry tree;

a rough classification module for performing a rough classification for the target patents by using the marks;

a fine classification module for performing a fine classification for the target patents according to a result of the rough classification;

the system performs automatic industry classification by executing the method of the first object.

The present invention provides the automatic industry classification method and system which reduce annotation quantity, and improve calculation efficiency and the classification accuracy at the same time.

DETAILED DESCRIPTION OF THE EMBODIMENTS

The present invention is further described with reference to the drawings and specific embodiments.

Embodiment 1

Figure 1:
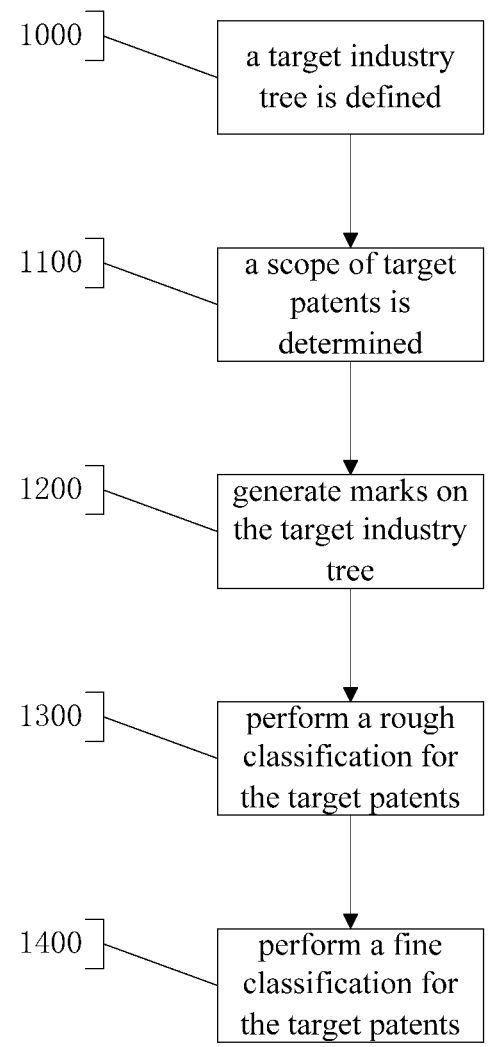
FIG. 1 is a flowchart of a preferred embodiment of an automatic industry classification method according to the present invention.
Figure 2:
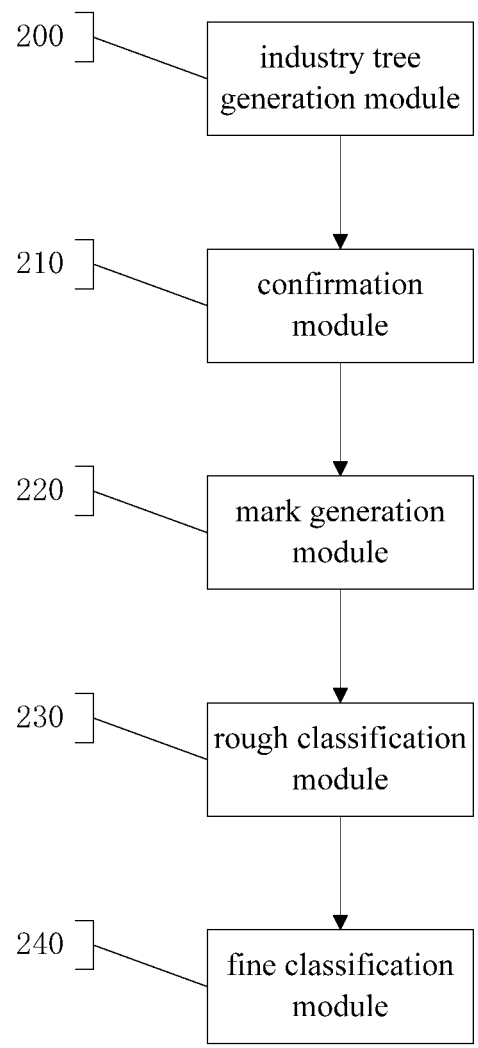
FIG. 2 is a block diagram of a preferred embodiment of an automatic industry classification system according to the present invention.

As shown in FIG. 1 and FIG. 2, step 1000 is executed, and a target industry tree is defined by using an industry tree generation module 200, and a scope of patents to be classified is manually determined as needed.

Step 1100 is executed, and a scope of target patents is determined by using a confirmation module 210. An industry tree I={$i_1, \ldots, i_j, \ldots, i_n$} is defined as needed, wherein, $i_j \in I$ and is a first level industry, j is a serial number of the first level industry, 1≤j≤n, n is the number of all leaf nodes of I. $i_{jkl} \ldots = \{i_{jkl \ldots 1}, \ldots, i_{jkl \ldots t}\}$ is set as any non-leaf node of I, degree of other nodes except the leaf nodes is greater than or equal to 2, wherein, k is a serial number of a second level industry, l is a serial number of a third level industry, and t is a serial number of a penultimate level industry.

Step 1200 is executed, and a mark generation module 220 is used to generate marks on the target industry tree. The number p of patents which can be marked is determined according to resource constraints, p≥N, each leaf node of the industry tree should be marked with at least one patent belonging to the node, wherein, N is the number of the last level industry.

Figure 1A:
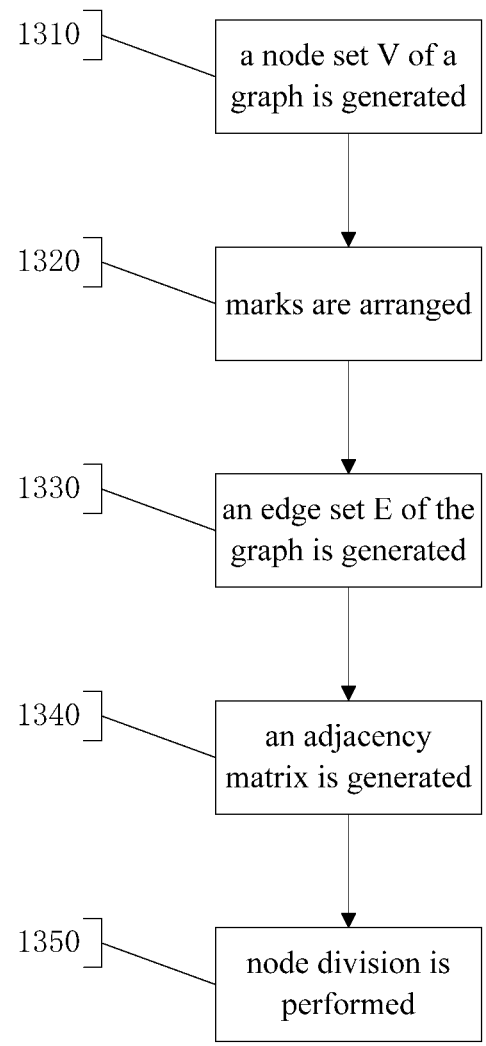
FIG. 1A is a flowchart of a rough classification method for target patents in the embodiment shown in FIG. 1 of industrial automatic classification method according to the present invention.

Step 1300 is executed, and a rough classification module 230 is used to perform a rough classification for the target patents by using the marks, and nodes above the leaf node are determined. As shown in FIG. 1A, step 1310 is executed, and a node set V of a graph is generated. IPC(s) of each target patent is defined as an IPC combination IPC$_v$= {ipc$_1, \ldots,$ ipc$_q$} and all different IPC combinations of the target patents form the node set V.

Step 1320 is executed, and the marks are arranged. The industry on the leaf node marked with patents is taken as a classification $\gamma_i \in \mathcal{Y}$ of the leaf node, the number of nodes which have been marked is set to be l, a sequence of the nodes is adjusted, and the marked nodes is adjusted to be the front, then 1≤i≤l. Whether l<<the number of unmarked nodes u is verified, and if not, adjusting the marked patent, otherwise V={IPC$_1, \ldots,$ IPC$_l$, IPC$_{l+1} \ldots,$ IPC$_{l+u}$}.

Step 1330 is executed, and an edge set E of the graph is generated. The edge set E is a matrix, and weight $e_{ij}$ of edges between two vertices is the number of patents in a union IPC$_i \cup$IPC$_j$ of IPCs of the two vertices, wherein, $e_{ij}$ is value in the matrix E.

Figure 1B:
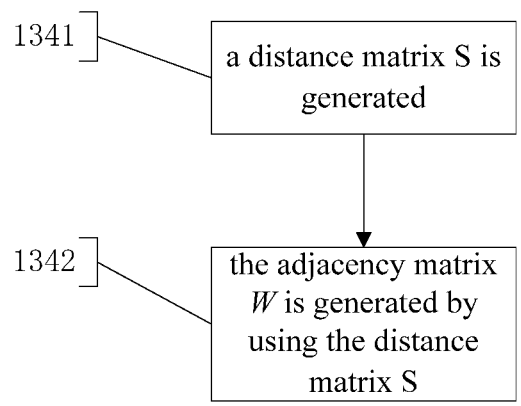
FIG. 1B is a flowchart of a generating method of an adjacency matrix in the embodiment shown in FIG. 1 of industrial automatic classification method according to the present invention.

Step 1340 is executed, and an adjacency matrix is generated. As shown in FIG. 1B, step 1341 is executed, and a distance matrix S is generated. A calculation formula of distance matrix S is $s_{ij}=\|e_i-e_j\|_2$, wherein, $e_i$ and $e_j$ are respectively the i-th row and the j-th row of the edge set E.

Step 1342 is executed, and the adjacency matrix W is generated by using the distance matrix S.

Figure 1C:
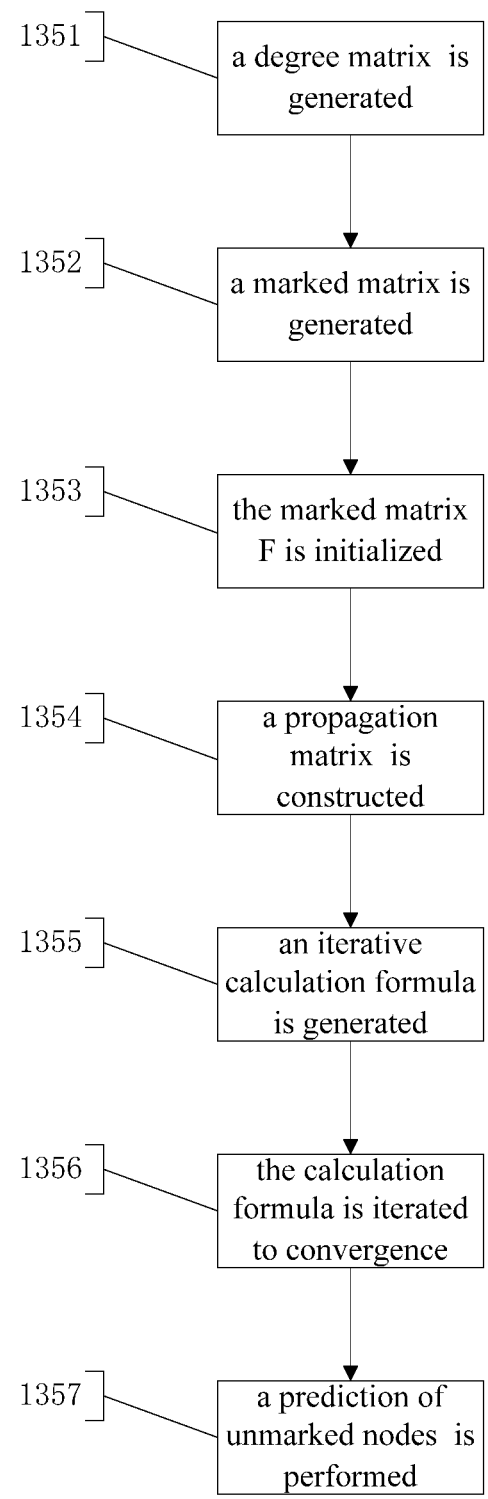
FIG. 1C is a flowchart of a node division method in the embodiment shown in FIG. 1 of industrial automatic classification method according to the present invention.

Step 1350 is executed, and node division is performed. As shown in FIG. 1C, step 1351 is executed, and a degree matrix $D=diag(d_1, d_2, \ldots, d_{l+u})$ is generated, diagonal elements of the degree matrix is $d_i=\Sigma_{j=1}^{l+u}W_{ij}$, wherein, u is the number of unmarked nodes, and $W_{ij}$ is the adjacent matrix.

Step 1352 is executed, and a marked matrix is generated, a nonnegative $(l+u)\times|\mathcal{Y}|$ marked matrix $F=(F_1^T, F_2^T, \ldots, F_{l+u}^T)^T$, the element of the i-th row $F_i=(F_{i1}, F_{i2}, \ldots, F_{i|\mathcal{Y}|})$ is a marked vector of $IPC_i$ in the node set, a classification rule is $\gamma_i=\text{argmax}^{x_{1\leq j\leq|\mathcal{Y}|}}F_{ij}$, wherein, $\mathcal{Y}$ is a set of industries, T represents transpose of the matrix.

Step 1353 is executed, and the marked matrix F is initialized, for $i=1, 2, \ldots, m$ and $j=1, 2, \ldots, |\mathcal{Y}|$, $$F(0) = Y_{ij} = \begin{cases} 1, & \text{if } (1 \leq i \leq l) \wedge (y_i = j) \\ 0, & \text{otherwise} \end{cases}.$$

Step 1354 is executed, and a propagation matrix $$B = D^{-\frac{1}{2}}WD^{-\frac{1}{2}}$$

is constructed, wherein, $$D^{-\frac{1}{2}} = \text{diag}\left(\frac{1}{\sqrt{d_1}}, \frac{1}{\sqrt{d_2}}, \ldots, \frac{1}{\sqrt{d_{l+u}}}\right),$$

d represents diagonal elements of the degree matrix D.

Step 1355 is executed, and an iterative calculation formula $F(t+1)=\alpha BF(t)+(1-\alpha)Y$ is generated, wherein, $\alpha \in (0, 1)$ is a parameter, $F(t)$ is a result of the t-th iteration, and Y is an initial matrix.

Step 1356 is executed, and the calculation formula is iterated to convergence to obtain a state $$F^* = \lim_{t\to\infty} F(t) = (1-\alpha)(M-\alpha B)^{-1}Y$$

under convergence, wherein, M is a unit matrix.

Step 1357 is executed, and a prediction of unmarked nodes $\gamma_i=\text{argmax}^{x_{1\leq j\leq|\mathcal{Y}|}}F_{ij}^*$ is performed, wherein, $l+1\leq i\leq l+u$.

Figure 1D:
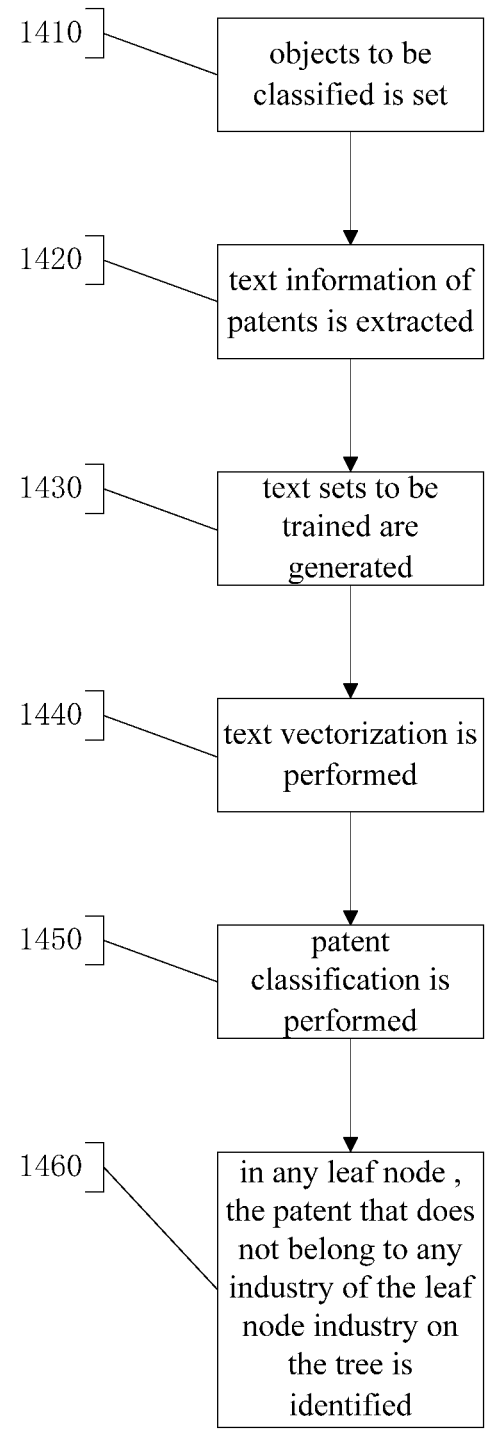
FIG. 1D is a flowchart of a fine classification method for target patents in the embodiment shown in FIG. 1 of industrial automatic classification method according to the present invention.

Step 1400 is executed, and a fine classification module 240 is used to perform a fine classification for the target patents according to a result of the rough classification. As shown in FIG. 1D, step 1410 is executed, and objects to be classified is set. The patent nodes of each class divided in the step 1300 are taken as a group, that means patents corresponding to node marked as $\gamma_i \in \mathcal{Y}$ are a group, there are $|\mathcal{Y}|$ groups.

Step 1420 is executed, and text information of patents is extracted. Abstract, claims and description of each patent in each group are extracted, word segmentation of text information of patent is performed by using an existing tool, and a text set $G=\{g_1, \ldots, g_n\}$ is generated, wherein $g_i=(p_{i1},p_{i2},p_{i3})$, $p_{i1}$, $p_{i2}$, and $p_{i3}$ are respectively word sequences obtained by word segmentation of the abstract, the claims, and the description of the i-th patent.

Step 1430 is executed, and text sets to be trained are generated. The text sets to be trained comprise the text set G, a text set $G_1=\{p_{11}, \ldots, p_{n1}\}$, a text set $G_2=\{p_{12}, \ldots, p_{n2}\}$ and a text set $G_3=\{p_{13}, \ldots, p_{n3}\}$, which are respectively composed of word segmentation results of the all-texts, the abstracts, the claims, and the descriptions of the patents in the group.

Figure 1E:
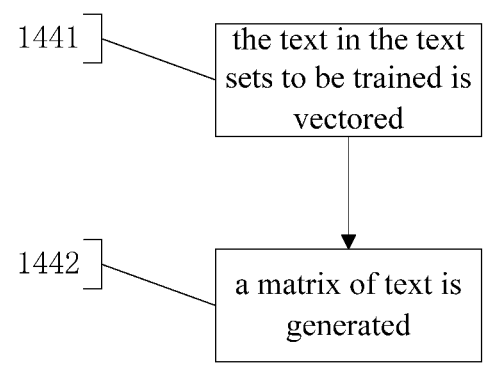
FIG. 1E is a flowchart of a text vectorization method in the embodiment shown in FIG. 1 of industrial automatic classification method according to the present invention.

Step 1440 is executed, and text vectorization is performed. As shown in FIG. 1E, step 1411 is executed, and the text in the text sets to be trained is vectored. In each text set to be trained, an element $P=(t_1, \ldots, t_m)$ is a segmented word sequence with m elements, $t_i \in P$ is determined by w words $t_{i,\ context}=\{t_{i-w}, \ldots, t_{i-2}, t_{i-1}, t_{i+1}, t_{i+2}, \ldots, t_{i+w}\}$ before and after it, and by maximizing $$\frac{1}{m}\sum_{i=w}^{m-w} \log\ p(t_i \mid t_{i,\ context}, pid)$$

wherein, the pid is a paragraph number of $t_i$ in p, $$p(t_i \mid t_{i,\ context}, pid) = \frac{e^{y_{t_i}}}{\sum_j e^{y_j}},$$

$y_{t_i}=b+U\Phi(t_{i,\ context},pid)$, U and b are parameters of softmax, and a vector corresponding to P is obtained by training data to be trained using a stochastic gradient descent method. Wherein, $\Phi$ is a mapping operation.

Step 1442 is executed, and a matrix of text is generated. The vectorization results of $G=\{g_1, \ldots, g_n\}$, $G_1=\{p_{11}, \ldots, p_{n1}\}$, $G_2=\{p_{12}, \ldots, p_{n2}\}$ and $G_3=\{p_{13}, \ldots, p_{n3}\}$ are supposed to be respectively $H_1=\{h_{11}, \ldots, h_{n1}\}$, $H_2=\{h_{12}, \ldots, h_{n2}\}$, $H_3=\{h_{13}, \ldots, h_{n3}\}$, and $H_4=\{h_{14}, \ldots, h_{n4}\}$, then a generated set of matrix of text of target patents is $H=\{h_1, \ldots, h_n\}$, wherein $h_i=(h_{i1}, h_{i2}, h_{i3}, h_{i4})$.

Step 1450 is executed, and patent classification is performed. Marked patents are set as $S=\cup_{j=1}^{k}S_j \subset H$, wherein, $S_j \neq \emptyset$ is the marked patent of the j-th leaf node on the industry tree, j cluster centers of a k-means algorithm are initialized using the marked patents, and cluster membership of marked patents is not changed in an iterative updating process of clusters.

Figure 1F:
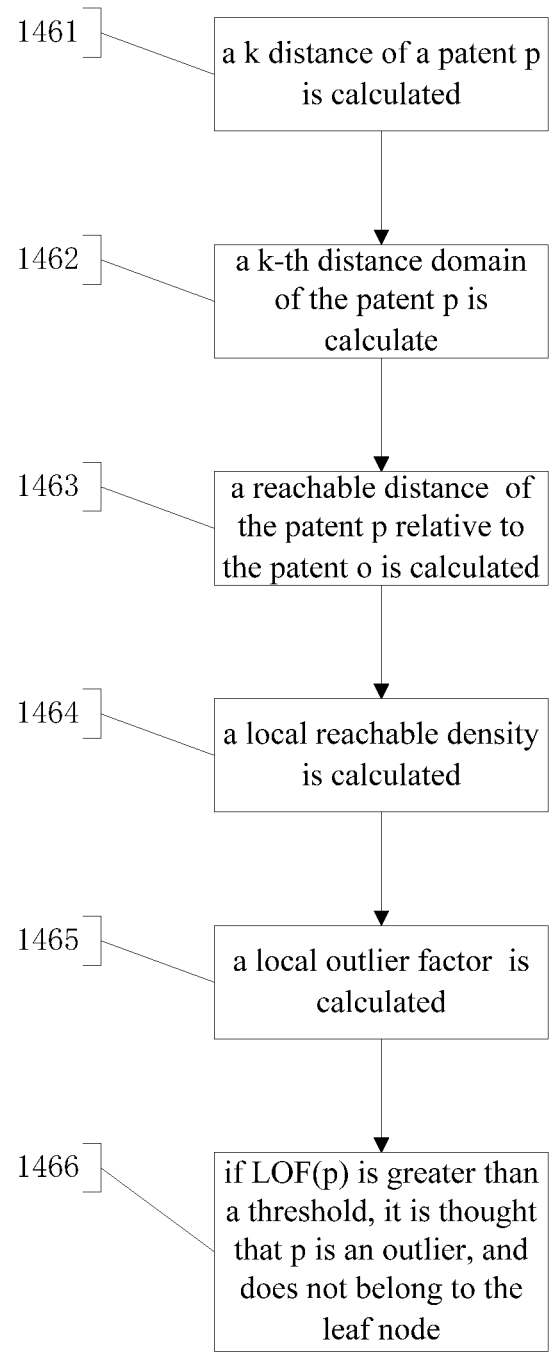
FIG. 1F is a flowchart of a patent classification method in the embodiment shown in FIG. 1 of industrial automatic classification method according to the present invention.

Step 1460 is executed, and in any leaf node classed by the step 45, the patent that does not belong to any industry of the leaf node on the tree is identified. As shown in FIG. 1F, step 1461 is executed, and a k distance of a patent p is calculated. A k-th distance of the patent p is set as k–distance(o), and in patents divided into a leaf node on the industry tree, there is a patent o, and the distance between the patent o and the patent p is d(p, o).

Step 1462 is executed, and a k-th distance domain of the patent p is calculated: a patent set whose distance from the patent p is ≤k–distance(o) is called the k-th distance domain $N_k(p)$ of the patent p.

Step 1463 is executed, and a reachable distance reachdist (p, o)=max{k–distance(o), ‖p–‖} of the patent p relative to the patent o is calculated. If the following two conditions are met, k–distance(o)=d(p, o):

① in the leaf node, there are at least k patents q to make d(p, q)≤d(p, o);

② in the leaf node, there are at most k−1 patents q to make d(p, q)<d(p, o).

Step 1464 is executed, and a local reachable density $$lrd_k(p) = \frac{|N_k(p)|}{\sum_{o \in N_n(p)} reach_{dist_k}(p, o)}$$

is calculated.

Step 1465 is executed, and a local outlier factor $$LOF_k(p) = \frac{\sum_{o \in N_n(p)} \frac{lrd_k(o)}{lrd_k(p)}}{|N_k(p)|}$$

is calculated.

Step 1466 is executed, and if LOF(p) is greater than a threshold, it is thought that p is an outlier, and does not belong to the leaf node.

Embodiment 2

An automatic industry classification method comprises the following steps.

1. Defining a target industry tree. An industry tree $I=\{i_1, \ldots, i_j, \ldots, i_n\}$ is defined as needed, wherein, $i_j \in I$ and is a first level industry, and $i_j$ may be divided into second level industries, $i_j=\{i_{j1}, \ldots, i_{jm}\}$, and so on, any non-leaf node of I is $i_{jkl\ldots} = \{i_{jkl\ldots 1}, \ldots, i_{jkl\ldots t}\}$. According to a general practice of industry division, degree of other nodes except the leaf nodes is greater than or equal to 2. The number of leaf nodes under I is set as N.

2. Determining a scope of target patents. The scope of patents to be classified is manually determined as needed, such as applications in a certain country or applications in certain years.

3. Generating marks. The number p of patents which can be marked is determined according to resource constraints, $p \geq N$, each leaf node of the industry tree should be marked with at least one patent belonging to the node.

4. Performing a rough classification for the target patents, that is determining nodes above the leaf node.

(1) Generating a node set V of a graph: IPC(s) of each target patent is defined as an IPC combination $IPC_v = \{ipc_1, \ldots, ipc_q\}$, and all different IPC combinations of the target patents form the node set V.

(2) Arranging marks: the industry on the leaf node marked with patents are taken as a classification $\gamma_i \in \mathcal{Y}$ of the leaf node, the number of nodes which have been marked is set to be l, a sequence of the nodes is adjusted, and the marked nodes is adjusted to be the front, then $1 \leq i \leq l$, whether l<<the number of unmarked nodes u is verified, and if not, adjusting the marked patent until yes, otherwise $V = \{IPC_1, \ldots, IPC_l, \ldots, IPC_{l+1} \ldots, IPC_{l+u}\}$.

(3) Generating an edge set E of the graph: the E may be expressed as a matrix, a union of IPCs of two vertices is $IPC_i \cup IPC_j$, then weight of edges between the two vertices $e_{ij}$ is equal to the number of patents with IPC in $IPC_i \cup IPC_j$.

(4) Generating an adjacency matrix:

(4.1) a distance matrix S is generated using such as Euclidean distance, $s_{ij} = \|e_i - e_j\|_2$;

(4.2) the adjacency matrix W is generated by using the distance matrix S by using such as a full-connected method of Gaussian kernel function.

(5) Performing node division:

(5.1) a degree matrix $D = diag(d_1, d_2, \ldots, d_{l+u})$ is generated, diagonal elements of the degree matrix is $d_i = \sum_{j=1}^{l+u} W_{ij}$;

(5.2) a marked matrix is generated, a nonnegative $(l+u) \times |\mathcal{Y}|$ marked matrix $F = (F_1^T, F_2^T, \ldots, F_{l+u}^T)^T$, the element of the i-th row $F_i = (F_{i1}, F_{i2}, \ldots, F_{i|\mathcal{Y}|})$ is a marked vector of $IPC_i$ in the node set, a classification rule is $\gamma_i = argmax \, x_{1 \leq j \leq |\mathcal{Y}|} F_{ij}$;

(5.3) the marked matrix F is initialized, for $i=1, 2, \ldots, m$ and $j=1, 2, \ldots, |\mathcal{Y}|$, $$F(0) = Y_{ij} = \begin{cases} 1, & \text{if } (1 \leq i \leq l) \land (y_i = j) \\ 0, & \text{otherwise} \end{cases};$$

(5.4) a propagation matrix $$B = D^{-\frac{1}{2}} W D^{-\frac{1}{2}}$$

is constructed, wherein, $$D^{-\frac{1}{2}} = diag\left(\frac{1}{\sqrt{d_1}}, \frac{1}{\sqrt{d_2}}, \ldots, \frac{1}{\sqrt{d_{l+u}}}\right);$$

(5.5) an iterative calculation formula $F(t+1) = \alpha BF(t) + (1-\alpha)Y$ is generated, wherein, $\alpha \in (0,1)$ is a parameter;

(5.6) the calculation formula is iterated to convergence to obtain a state $$F^* = \lim_{t \to \infty} F(t) = (1-\alpha)(M - \alpha B)^{-1} Y;$$

(5.7) a classification prediction of unmarked nodes $\gamma_i = argmax \, x_{1 \leq j \leq |\mathcal{Y}|} F_{ij}^*$ is performed, wherein, $l+1 \leq i \leq l+u$.

5. Performing a fine classification for target patents, that is determining the leaf node.

(1) Setting objects to be classified: the patents corresponding to node of each class divided in the step 4 are taken as a group, that means patents corresponding to node marked as $\gamma_i \in \mathcal{Y}$ are a group, there are $|\mathcal{Y}|$ groups.

(2) Extracting text information of patents: abstract, claims and description (hereinafter referred to as "all-text") of each patent in each group are extracted, word segmentation of text information of patent is performed by using an existing tool, and a text set $G = \{g_1, \ldots, g_n\}$ is generated, wherein $d_i = (p_{i1}, p_{i2}, p_{i3})$, $p_{i1}$, $p_{i2}$, and $p_{i3}$ are respectively word sequences obtained by word segmentation of the abstract, the claims, and the description of the i-th patent.

(3) Generating 4 text sets to be trained: G, $G_1 = \{p_{11}, \ldots, p_{n1}\}$, $G_2 = \{p_{12}, \ldots, p_{n2}\}$ and $G_3 = \{p_{13}, \ldots, p_{n3}\}$, which are respectively composed of word segmentation results of the all-texts, the abstracts, the claims, and the descriptions of the patents in the group.

(4) Text vectorization is performed.

(4.1) the text in the four text sets to be trained is vectored. In each text set to be trained, an element $P = (t_1, \ldots, t_m)$ is a segmented word sequence with m elements, $t_i \in P$ is determined by w words $t_{i, \, context} = \{t_{i-w}, \ldots, t_{i-2}, t_{i-1}, t_{i+1}, t_{i+2}, \ldots, t_{i+w}\}$ before and after it, and by maximizing $$\frac{1}{m} \sum_{i=w}^{m-w} \log p(t_i | t_{i, context}, pid)$$

wherein, the pid is a paragraph number of $t_i$ in p, $$p(t_i \mid t_{i, context}, pid) = \frac{e^{y_{t_i}}}{\sum_j e^{y_j}},$$

$y_{t_i}$=b+U$\Phi$($t_{i, context}$,pid), U and b are parameters of softmax, and a vector corresponding to P is obtained by training data to be trained using a stochastic gradient descent method.

(4.2) A matrix of text is generated. The vectorization results of G={$g_1$, ..., $g_n$}, $G_1$={$p_{11}$, ..., $p_{n1}$}, $G_2$={$p_{12}$, ..., $p_{n2}$} and $G_3$={$p_{13}$, ..., $p_{n3}$} are supposed to be respectively $H_1$={$h_{11}$, ..., $h_{n1}$}, $H_2$={$h_{12}$, ..., $h_{n2}$}, $H_3$={$h_{13}$, ..., $h_{n3}$}, and $H_4$={$h_{14}$, ..., $h_{n4}$}, then a generated set of matrix of text of target patents is H={$h_1$, ..., $h_n$}, wherein $h_i$=$h_{i1}$, $h_{i2}$, $h_{i3}$, $h_{i4}$).

(5) Patent classification is performed. Marked patents are set as S=$\cup_{j=1}^{k} S_j \subset$ H, wherein, $S_j \neq \emptyset$ is the marked patent of the j-th leaf node on the industry tree, j cluster centers of a k-means algorithm are initialized using the marked patents, and cluster membership of marked patents is not changed in a iterative updating process of clusters.

(6) The patent that does not belong to any industry of the leaf node industry on the tree is identified, in any leaf node classed in (5):

(6.1) a k distance of a patent p:

for a positive integer k, the k-th distance of the patent p is set as k–distance(o), and in patents divided into a leaf node on the industry tree, there is a patent o, and the distance between the patent o and the patent p is d(p, o). If the following two conditions are met, k–distance (o)=d(p, o):

① in the leaf node, there are at least k patents q to make d(p, q)≤d(p, o);

② in the leaf node, there are at most k–1 patents q to make d(p, q)<d(p, o);

(6.2) a k-th distance domain of the patent p:

a patent set whose distance from the patent p is ≤k–distance(o) is called the k-th distance domain of the patent p, and is record as $N_k$(p);

(6.3) a reachable distance of the patent p relative to the patent o: reachdist(p, o)=max{k–distance(o), ∥p–o∥};

(6.4) a local reachable density:

$$lrd_k(p) = \frac{|N_k(p)|}{\sum_{o \in N_n(p)} reach_d dist_k(p, o)};$$

(6.5) a local outlier factor:

$$LOF_k(p) = \frac{\sum_{o \in N_n(p)} \frac{lrd_k(o)}{lrd_k(p)}}{|N_k(p)|};$$

(6.6) if LOF(p) is greater than a threshold, it is thought that p is an outlier, and does not belong to the leaf node.

In order to better understand the present invention, the detailed description is made above in conjunction with the specific embodiments of the present invention, but it is not a limitation of the present invention. Any simple modification to the above embodiments based on the technical essence of the present invention still belongs to the scope of the technical solution of the present invention. Each embodiment in this specification focuses on differences from other embodiments, and the same or similar parts between the various embodiments can be referred to each other. As for the system embodiment, since it basically corresponds to the method embodiment, the description is relatively simple, and the relevant part can refer to the part of the description of the method embodiment.

What is claimed is:

1. An automatic industry classification method, comprising determining a scope of target patents, wherein the automatic industry classification method further comprises following steps:

step 1: defining a target industry tree;
step 2: generating marks on the target industry tree;
step 3: performing a rough classification for the target patents by using the marks; and
step 4: performing a fine classification for the target patents according to a result of the rough classification, wherein step 1 further comprises:

defining an industry tree I={[$i_1$, ..., $i_j$, ..., $i_n$}, wherein $i_j \in$ I and is a first level industry, j is a serial number of the first level industry, 1≤j≤n, and n is a number of all leaf nodes of I; and setting $i_{jkl\ldots t}$={$i_{jkl}$, ..., $i_{jkl\ldots t}$} as any non-leaf node of I, wherein degree of other nodes except the leaf nodes is greater than or equal to 2, k is a serial number of a second level industry, l is a serial number of a third level industry, and t is a serial number of a penultimate level industry;

wherein the determining of the scope of the target patents is to manually determine the scope of the target patents to be classified, wherein step 3 comprises determining nodes above the leaf nodes; and wherein step 3 further comprises following sub-steps:

step 31: generating a node set V of a graph;
step 32: arranging the marks;
step 33: generating an edge set E of the graph;
step 34: generating an adjacency matrix; and
step 35: performing node division, wherein step 35 further comprises following sub-steps:

step 351: generating a degree matrix D=diag ($d_1$, $d_2$, ..., $d_{l+u}$), having a diagonal element $d_i$=$\Sigma_{j=1}^{l+u} W_{ij}$, wherein, u is a number of unmarked nodes, and $W_{ij}$ is an adjacent matrix;

step 352: generating a marked matrix, and a nonnegative (l+u)×|γ| marked matrix F= ($F_1^T$, $F_2^T$, ..., $F_{l+u}^T$)$^T$, wherein an element of an i-th row $F_i$=($F_{i1}$, $E_{i2}$, ..., $F_{i|\gamma|}$) is a marked vector of an International Patent Classification (IPC) in the node set, a classification rule is $\gamma_i$=ar gmax$_{1 \leq j \leq |\gamma|} F_{ij}$, wherein, γ is a set of industries, and T represents a transposition a matrix;

step 353: initializing the nonnegative marked matrix F, for i=1,2, ..., m and j=1,2, ... |γ[

$$F(0) = Y_{ij} = \begin{cases} 1, & \text{if } (1 \leq i \leq l) \wedge (y_i = j) \\ 0, & \text{otherwise} \end{cases};$$

step 354: constructing a propagation matrix $$B = D^{-\frac{1}{2}} W D^{-\frac{1}{2}}$$

wherein, $$D^{-\frac{1}{2}} = \text{diag}\left(\frac{1}{\sqrt{d_1}}, \frac{1}{\sqrt{d_2}}, \ldots, \frac{1}{\sqrt{d_{l+u}}}\right),$$

d represents diagonal elements of th degree matric D;

step 355: generating an iterative calculation formula $F(t+1)=\alpha*B*F(t)+(1-\alpha)Y$—wherein, $\alpha \in (0,1)$ is a parameter, $F(t)$ is a result of a t-th iteration, and Y is an initial matrix;

step 356: iterating the iterative calculation formula to convergence to obtain a state $F^*=\lim/t\to\infty F(t)=(1-\alpha)(M-\alpha B)^{-1}Y$ under convergence, wherein, M is a unit matrix; and step 357: performing a prediction of the unmarked nodes $\gamma_i=\text{argmax}_{1\leq j\leq |\gamma|}F_{ij}^*$, wherein, $l+1\leq i\leq l+u$.

2. The automatic industry classification method according to claim 1, wherein step 2 further comprises:

according to resource constraints, determining a number p of patents to be marked, wherein p≥N, each leaf node of the target industry tree is marked with at least one patent belonging to the node, and N is a number of a last level industry.

3. The automatic industry classification method according to claim 1, wherein step 31 further comprises:

defining one or more International Patent Classification (IPC) of each target patent as an IPC combination wherein all different IPC combinations of the target patents form the node set V.

4. The automatic industry classification method according to claim 3, wherein step 31 further comprises:

taking an industry on a leaf node marked with patents as a classification of the leaf node, setting a number of marked nodes to be l, adjusting a sequence of the leaf nodes, wherein the marked nodes is adjusted to be the front, then $1\leq i\leq l$; and verifying whether l<< a number of unmarked nodes u, and if not, adjusting the leaf nodes marked with patents, otherwise $V=\{IPC_1, \ldots, IPC_l, IPC_{l+1} \ldots, IPC_{l+u}\}$.

5. The automatic industry classification method according to claim 3, wherein the edge set E is a matrix, and a weight $e_{ij}$ of edges between two vertices is a number of patents in a union $IPC_i \cup IPC_j$ of IPCs of the two vertices, wherein, $e_{ij}$ is value in the matrix E.

6. The automatic industry classification method according to claim 1, wherein step 34 further comprises following sub-steps:

step 341: generating a distance matrix S, wherein a calculation formula of the distance matrix S is $S_{ij}=\|e_i-e_j\|_2$, wherein, $e_i$ and $e_j$ are respectively an i-th row and a j-th row of the edge set E;

step 342: generating the adjacency matrix W by using the distance matrix S.

7. The automatic industry classification method according to claim 1, wherein step 4 further comprises following sub-steps:

step 41: setting objects to be classified;

step 42: extracting text information of patents;

step 43: generating text sets to be trained;

step 44: performing text vectorization;

step 45: performing patent classification; and step 46: in any leaf node classed by the step 45, identifying a patent, wherein the patent does not belong to any industry of the leaf nodes on the target industry tree.

8. The automatic industry classification method according to claim 7, wherein step 41 further comprises taking patent nodes of each class divided in step 3 as a group, wherein patents corresponding to a patent node marked as $\gamma_i \in \gamma$ are in the group, and there are $|\gamma|$ groups;

wherein step 42 further comprises extracting an abstract, claims and a description of each patent in each group, performing word segmentation of text information of patent by using an existing tool, and generating a text set $G=\{g_1, \ldots, g_n\}$, wherein $g_i=(p_{i1}, P_{i2}, P_{i3})$, $p_{i1}$, $P_{i2}$, and $p_{i3}$ are respectively word sequences obtained by word segmentation of an abstract, claims, and a description of an i-th patent; and wherein the text sets to be trained comprise the text set G, a text set $G_1=\{p_{11}, \ldots, P_{n1}\}$, a text set $G_2=\{p_{12}, \ldots, P_{n2}\}$ and a text set $G_3=\{p_{13}, \ldots, P_{n3}\}$, the text set G, the text set $G_1$, the text set $G_2$, the text set $G_3$ are respectively composed of word segmentation results of all-texts, abstracts, claims, and descriptions of the patents in the group.

9. The automatic industry classification method according to claim 8, wherein step 44 further comprises following sub-steps:

step 441: vectoring a text in the text sets to be trained, wherein in each text set to be trained, an element $P=(t_1, \ldots, t_m)$ is a segmented word sequence with m elements, $t_i \in P$ is determined by w words $t_{i,\,context}=\{t_{i-w} \ldots, t_{i-2}, t_{i-1}, t_{i+1}, t_{i+2}, \ldots, t_{i+w}\}$ before and after $t_i$, and by maximizing $$\frac{1}{m}\sum_{i=w}^{m-w}\log p(t_i \mid t_{i,context}, pid)$$

wherein, the pid is a paragraph number of $t_i$ in p, $$p(t_i \mid t_{i,\,context}, pid) = \frac{e^{y_{t_i}}}{\sum_j e^{y_j}},$$

$y_{t_i}=b+\Phi(t_{i,\,contexts}, pid)$, U and b are parameters of softmax, wherein $\Phi$ is a mapping operation, and a vector corresponding to P is obtained by training data to be trained using a stochastic gradient descent method; and step 442: generating a matrix of the text, wherein vectorization results of $G=\{g_1, \ldots, g_n\}$, $G_1=\{P_{11}, \ldots, P_{n1}\}$, $G_2=\{P_{12}, \ldots, P_{n2}\}$ and $G_3=\{P_{13}, \ldots, P_{n3}\}$ are supposed to be respectively $H_1=\{h_{11}, \ldots, h_{n1}\}$, $H_2=\{h_{12}, \ldots, h_{n2}\}$, $H_3=\{h_{13}, \ldots, h_{n3}\}$, and $H_4=\{h_{14}, \ldots, h_{n4}\}$, then a generated set of the matrix of the text of target patents is $H=\{h_1, \ldots, h_n\}$, wherein $h_i=(h_{i1}, h_{i2}, h_{i3}, h_{i4})$.

10. The automatic industry classification method according to claim 9, wherein step 45 further comprises setting marked patents as $S=\cup_{j=1}^{k}S_j \subset H$, wherein, $S_j\neq\emptyset$ is the marked patent of a j-th leaf node on the industry tree, and initializing j cluster centers of a k-means algorithm using the marked patents, wherein a cluster membership of the marked patents is not changed in an iterative updating process of clusters.

11. The automatic industry classification method according to claim 7, wherein step 46 further comprises following sub-steps:

step 461: calculating a k distance of a patent p, and setting a k-th distance of the patent p-as k-distance(o), wherein in patents divided into a leaf node on the industry tree, there is a patent o, and the distance between the patent o and the patent p isd(p, o);

step 462: calculating a k-th distance domain of the patent p, wherein a distance of a patent set from the patent p is ≤k-distance (o), and the patent set is called the k-th distance domain $N_k(p)$ of the patent p;

step 463: calculating a reachable distance reachdist (p, o)=max {k-distance(o), ‖p-o‖} of the patent p relative to the patent o;

step 464: calculating a local reachable density $$lrd_k(p) = \frac{|N_k(p)|}{\sum_{o \in N_n(p)} reach_d ist_k(p, o)}$$

step 465: calculating a local outlier factor $$LOF_k(p) = \frac{\sum_{o \in N_n(p)} \frac{lrd_k(o)}{lrd_k(p)}}{|N_k(p)|}$$

and step 466: if LOF(p) is greater than a threshold, determining that p is an outlier, and does not belong to the leaf node;

wherein if following two conditions are met, k-distance (o)=d(p,o):

a first condition is that: in the leaf node, there are at least k patents q to maked(p, q)≤d(p,o);

a second condition is that: in the leaf node, there are at most k−1 patents q to make d(p,q)<d(p,o).

* * * * *